United States Patent [19]

Robbins et al.

[11] Patent Number: 4,935,064

[45] Date of Patent: Jun. 19, 1990

[54] IODINE STERILIZATION OF DEIONIZED WATER IN SEMICONDUCTOR PROCESSING

[75] Inventors: John B. Robbins, Sherman; Lawrence D. Dyer, Richardson; Mohendra S. Bawa, Plano, all of Tex.

[73] Assignee: Texas Instruments Incorporated, Dallas, Tex.

[21] Appl. No.: 173,837

[22] Filed: Mar. 28, 1988

[51] Int. Cl.$^5$ .............................................. C03C 23/00
[52] U.S. Cl. ...................................................... 134/2
[58] Field of Search ........................................... 134/2

[56] References Cited

PUBLICATIONS

The Kirk-Othmer Encyclopedia of Chemical Technology, 3rd edition, vol. 13, pp. 649–677, John-Wiley, 1981.

Primary Examiner—Asok Pal
Assistant Examiner—Ourmazd S. Ojan
Attorney, Agent, or Firm—Gary C. Honeycutt; Melvin Sharp; Rhys Merrett

[57] ABSTRACT

Trace quantities of elemental iodine are added to deionized water used in the manufacture of semiconductor materials and devices in order to sterilize the water and the delivery system of microscopic life forms, and to leave the iodine in the flow all the way through processing except for those process steps where iodine may be detrimental to the process step.

16 Claims, 2 Drawing Sheets

IODINE STERILIZATION OF DEIONIZED WATER IN SEMICONDUCTOR PROCESSING

FIELD OF THE INVENTION

This invention relates to semiconductor processing and more particularly to a method of iodine treatment for improving deionized water and its delivery system used in the manufacture of semiconductor.

DISCUSSION OF THE PRIOR ART

An ever-present problem in semiconductor slice manufacturing and processing is the presence of bacteria, viruses, fungi, and yeasts in water feeds and their delivery systems, particularly in deionized water and its delivery system. Various yield problems of semiconductor materials have been traced to the presence of these living organisms.

Present processes used to destroy microscopic life forms in water include filtration, ultraviolet irradiation, periodic sterilization, high pipe velocities, and point-of-use filtration.

Ultraviolet irradiation does not kill all the bacteria and does not sterilize the delivery system. Among agents used in periodic sterilization are (1) formaldehyde, (2) hydrogen peroxide, and (3) ozone. Formaldehyde has the difficulty that the outer layer of bacteria inside a delivery pipe is converted to a relatively impervious barrier which protects the remainder of the bacteria like a shell.

Hydrogen peroxide has the difficulty that it will build up pressure in a closed system, and it is rather corrosive to some of the usual materials used in supply systems.

Ozone has the difficulty of attacking PVC piping and the usual filter materials, and it requires special safety measures because it is so poisonous to humans in trace concentrations.

All three periodic sterilization agents are expensive to use; formaldehyde and hydrogen peroxide because of the chemical costs, and ozone because it requires special materials for the delivery system and special safety precautions.

BRIEF SUMMARY OF THE INVENTION

The present invention is to a method which includes putting trace elemental iodine concentrations in deionized water that is used in the semiconductor industry, and removing the iodine at the point of use in processes where it is detrimental to a particular semiconductor process.

Removal is accomplished at point-of-use with standard carbon absorbers and with resin beds to remove iodine, iodide and hypoiodous ions. In many semiconductor processes it is not necessary to remove the trace iodine from deionized water. Typical iodine concentrations are in the range between 0.5 and 1.0 ppm, but effective killing of bacteria has been noted at 0.1 ppm. Concentrations up to 20 ppm are not harmful to the delivery system because the Langmuir corrosion index is the same as for water until the iodine concentration rises above 20 ppm. Iodine in trace concentrations also kill viruses, yeasts, and some fungi.

When trace iodine is introduced, the resistivity of deionized water drops from 18 megohm-cm to 1-4 megohm-cm because of the auto dissociation of elemental iodine in water into hydrogen iodide and hypoiodous acid. Since hypoiodous acid is equally as bactericidal as iodine, nothing is lost through the dissociation. The resistivity of deionized water can still be used as a quality check. This can be done before the iodinator and the iodinator can be shut off for short periods to allow the iodine-related ions to be swept out of the system.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT OF THE INVENTION

The present invention consists of using trace elemental iodine concentrations in deionized water used in the manufacture of semiconductor devices to remove bacteria and other microbiological contaminates which are detrimental to the production of semiconductor devices. Bacterial growth can cause imperfections on semiconductor slices during the polishing process and later at various steps in device manufacture, for example in the mask-making process.

Figure 1:
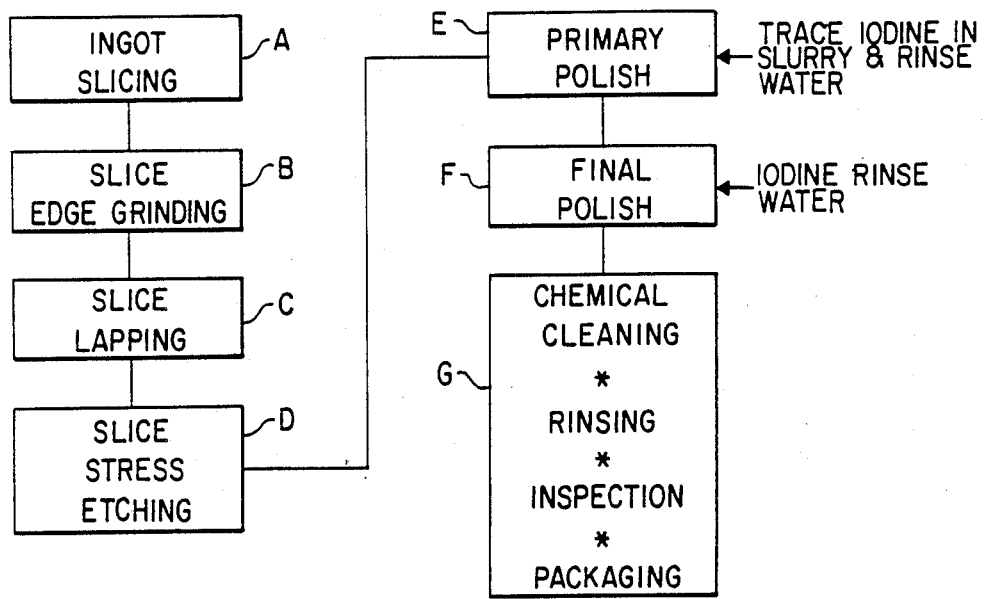
FIG. 1 is a block diagram of a basic semiconductor slice manufacturing process.

FIG. 1 is a block diagram of a semiconductor slice manufacturing process. In block A, the semiconductor ingot is sliced in to wafers and each wafer is cleaned to remove particles of the ingot produced during sawing. In block B the slice is edge ground to produce a circular shaped slice.

When slices are sawed from the ingot, the two faces of the slice are generally not parallel. In Block C the slice is lapped to make the two sides parallel. After lapping, the slice is stress etched and inspected (block D) to determine if there are any imperfections in the slice that would make it unusable in semiconductor manufacturing.

The accepted slices then go through a primary polish (block E) of an abrasive slurry. It is desirable at this point that any bacteria on the slice be removed. Therefore, the polishing slurry is made with abrasives in deionized water that has trace iodine in it. After the primary polish, the slice is rinsed and goes through the final polish (block F). It is very important at this point that there are no contaminates introduced during the final polish step therefore the iodine deionized water is used. After the final polish, the slices are chemically cleaned, rinsed, dried and given a final inspection.

An example of the usefulness of the invention is illustrated in a test using normal means to reduce bacteria levels and in one using trace iodine in the process. Semiconductor slices were chem-mechanically polished with a colloidal silica slurry, then rinsed, separated from the polish blocks, placed in fluorocarbon cassettes and passed on to the cleaning stage immersed in deionized water.

Deionized water is used in the slurry make-up water, the rinsing process, demounting process and the transfer process. Bacteria counts remained high in the polish rinse water despite efforts to reduce bacteria. Bacteria count fluctuated between 200 and 10,000 bacteria cultures per liter. When iodine was introduced to the rinse water and to the polish slurry at 1 ppm, and was given the required detention time, the bacteria count fell drastically below 200 and was mostly zero.

Figure 2:
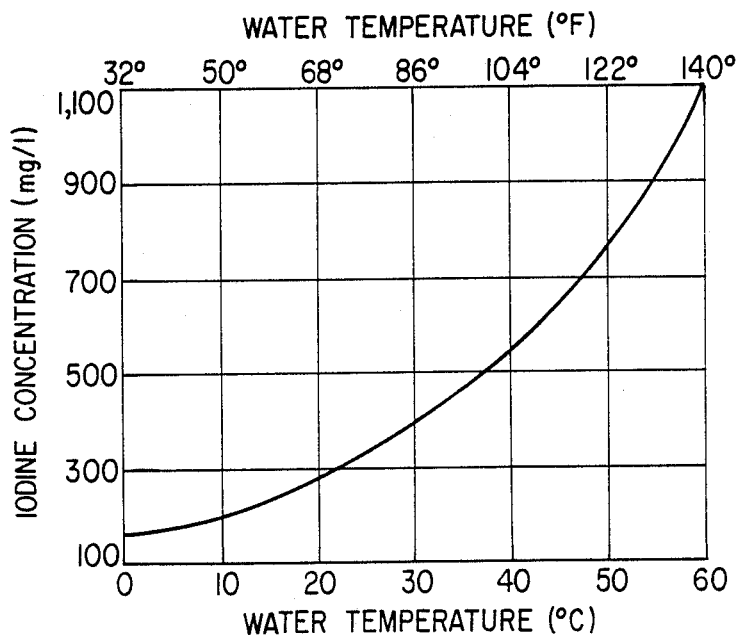
FIG. 2 illustrates the solubility of iodine in water as governed by the temperature of the water.
Figure 3:
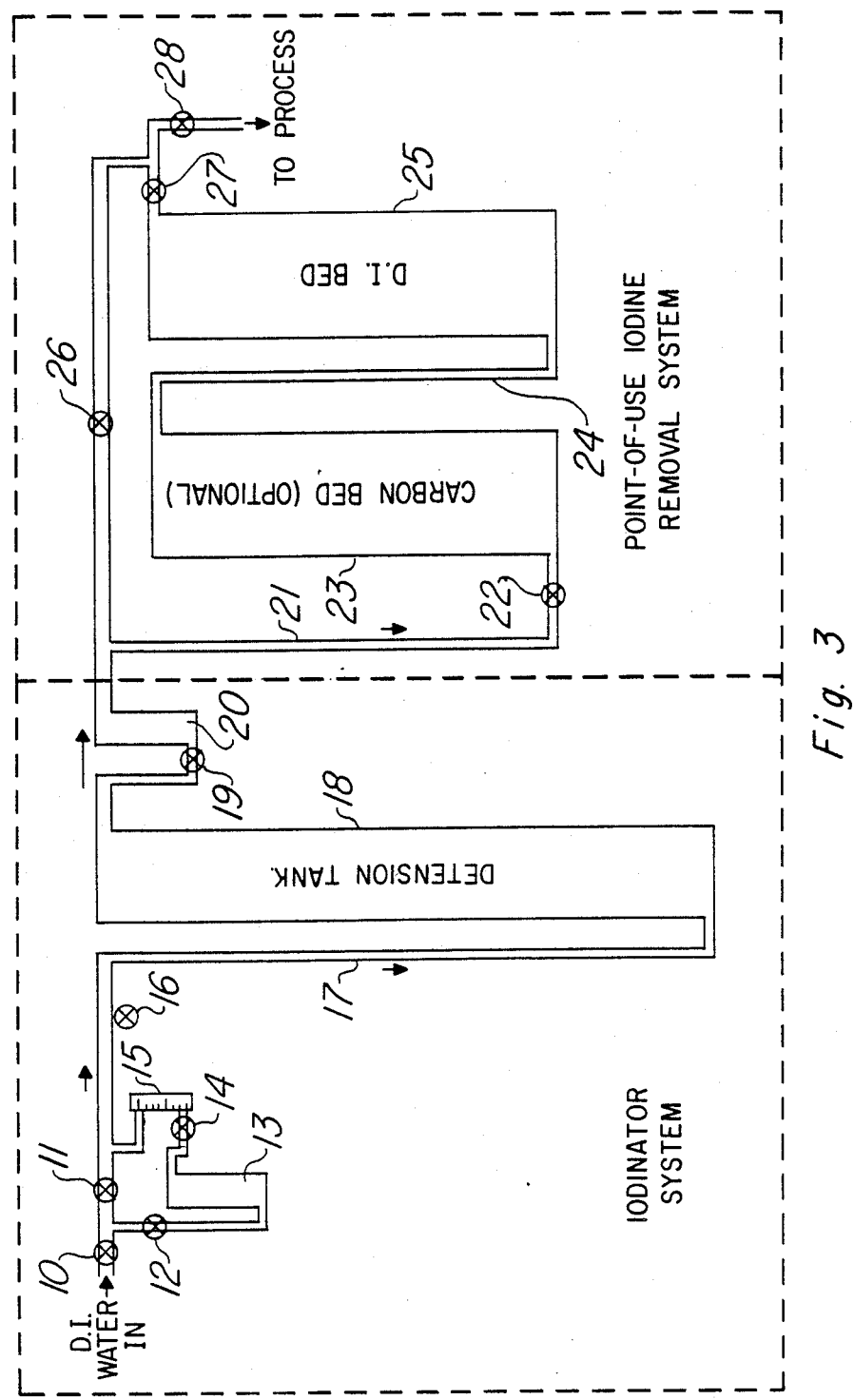
FIG. 3 illustrates an iodinator system and a point-of-use iodine removal system.

An example of a typical water iodination system is shown in FIG. 2. Deionized water is introduced into the system through valve 10. After valve 10 is a T-connection. Once branch of the T-connection goes through valve 12, through iodine feeder 13, valve 14 and flow meter 15.

The deionized water dissolves iodine up to its saturation value, which is governed by temperature as shown in FIG. 2. FIG. 2 is taken from taken from an article: A. P. Black, R. N. Kinman, W. C. Thomas Jr., Gerhard Freund, and E. D. Bird, "Use of Iodine for Disinfection," *Journal American Water Works Association*, Vol. 57, No. 11, November, 1965, pp. 1401–1421. If the iodinator temperature is known, then the saturation value is known form FIG. 2. When iodine is to be introduced into the deionized water, valve 12 is opened and valve 11 is partially closed to provide back pressure sufficient to drive some fluid through the iodinator system. The exact flow is set with fine adjust valve 14. It is advantageous if flowmeter 15 is placed in the feed stream before iodinator 13, because it can be made of more standard materials such as stainless steel. Otherwise the concentrated iodine solution will corrode some metal float materials and stainless steel fittings. However, when iodine is not to be introduced into the system, value 12 is closed and valve 11 is open.

Iodine treated deionized water flows through pipe 17 to detention tank 18. Detention tank is used to hold sufficient iodine treated deionized water to allow the bacteria or other microbiological contaminates to be killed prior to using the treated water in processing semiconductor material.

After leaving the detention tank 18, the treated deionized water passes through valve 19 and main flow meter 20. The concentration of iodine in the combined streams of deionized water is determined by the ratio of flows through flowmeters 15 and 20, respectively, multiplied by the saturation concentration that was dissolved in the iodinator 13. At this point the treated water may be routed through one of two different paths. If traces of iodine in the deionized water are to remain in the processing water, then valve 22 is closed and valve 26 is open, allowing the treated water to flow through valve 28 to the processing station.

In some processes, it may be desirable for the traces of iodine to be removed form the deionized water. In this case, yalve 26 is closed and valve 22 is opened. The treated water flows though a carbon bed filter and a resin filter to remove the trace iodine before it flows out valve 27 and valve 28 to the processing station, or through an anion or mixed bed filter alone.

Iodine has the advantage of being useful in system sterilization. The pipes connecting process stations can become contaminated with a build up of bacterial on the inner walls of the pipes.

Iodine reacts as follows:

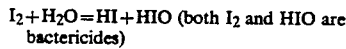
$I_2 + H_2O = HI + HIO$ (both $I_2$ and HIO are bactericides)

The HIO reaches the pipe wall with out decomposition, therefore it can kill the bacterial build-up and sterilize the system.

Iodine water has several advantages over present means of sterilizing deionized water. The first is the residual killing power. Since iodine is always present in the system, the bacteria continue to be killed regardless of the flow rate of the deionized water. Even systems that must operate only periodically are safe from the breeding bacteria. Some iodine may be absorbed by plastic tubing walls and retain killing power for some time.

If iodine is used before a reverse osmosis membrane, it bestows residual killing power on the membrane besides killing bacteria directly.

Another advantage of iodine is that it is relatively unreactive with piping , such as stainless steel o r polyvinylchloride, and normal filter media, whereas ozone attacks both, requiring special piping and filter materials.

Still another advantage is that iodine treatment of deionized water is relatively simple and inexpensive. The low cost of deionized water iodination comes essentially from the low concentrations required, typically 0.5 to 1.0 ppm, and the lack of complicated equipment, as shown in FIG. 2.

What is claimed:

1. A method of destroying and removing bacteria contamination in semiconductor material manufacturing comprising the steps of:
   including 0.1 to 20 ppm. of iodine in the deionized water used in mixing the polishing and lapping compounds used in lapping and polishing semiconductor slices; and
   using deionized water with trace amounts of iodine therein for rinsing the semiconductor slices after lapping and polishing.

2. The method according to claim 1, wherein the trace amount of iodine is less that 20 ppm.

3. The method according to claim 1, wherein the amount of iodine is in the range of 0.5 to 1.0 ppm.

4. The method according to claim 1, wherein in mixing the deionized water and iodine there is an autodissociation of elemental iodine in water into hydrogen iodide and hypoiodous acid.

5. The method according to claim 1, wherein the resistivity of the deionized water with the iodine therein is in the range of 1 to 4 megohm-cm.

6. A method of destroying and removing bacteria contamination in semiconductor material manufacturing comprising the steps of:
   including trace amounts of iodine in the deionized water used in mixing the polishing and lapping compounds used in lapping and polishing semiconductor slices; and
   using deionized water with trace amounts of said selected element therein for rinsing the semiconductor slices after lapping and polishing.

7. The method according to claim 1, wherein the trace amount of the element is less that 20 ppm.

8. The method according to claim 1, wherein the amount of element is in the range of 0.5 to 1.0 ppm.

9. The method according to claim 1, wherein in mixing the deionized water and the element there is an autodissociation of the element in water.

10. The method according to claim 1 wherein the the resistivity of the deionized water with the iodine therein is in the range of 1 to 4 megohm-cm.

11. The method according to claim 1 wherein the trace amount of iodine is removed from the deionized water prior to its use in further processing.

12. A method of destroying and removing bacteria contamination in semiconductor material and device manufacturing comprising the steps of:
  including trace amounts of iodine in the deionized water used in processing semiconductor materials and devices; and
  rinsing the semiconductor material and devices with the iodine containing deionized water during the manufacturing process at times when the semiconductor material and devices are normally rinsed with deionized water.

13. The method according to claim 12, wherein the trace amount of iodine is less that 20 ppm.

14. The method according to claim 12, wherein the amount of iodine is in the range of 0.5 to 1.0 ppm.

15. The method according to claim 12, wherein in mixing the deionized water and iodine there is an auto-dissociation of elemental iodine in water into hydrogen iodide and hypoiodous acid.

16. The method according to claim 12, wherein the resistivity of the deionized water with the iodine therein is in the range of 1 to 4 megohm-cm.

* * * * *